United States Patent [19]

Budzich

[11] 3,782,785

[45] Jan. 1, 1974

[54] BRAKE ANTI-SKID SYSTEM

[75] Inventor: Tadeusz Budzich, Moreland Hills, Ohio

[73] Assignee: The Weatherhead Company, Cleveland, Ohio

[22] Filed: June 5, 1972

[21] Appl. No.: 259,434

[52] U.S. Cl. ............. 303/21 F, 188/181 A, 303/13, 303/68
[51] Int. Cl. ............................................... B60t 8/12
[58] Field of Search ..................... 303/21 F, 13, 68; 188/181 A

[56] References Cited
UNITED STATES PATENTS

| | | | |
|---|---|---|---|
| 3,099,499 | 7/1963 | Parshall | 303/21 F |
| 3,059,973 | 10/1962 | Parshall | 303/21 F |
| 3,597,012 | 8/1971 | Packer et al. | 303/21 F |
| 3,600,043 | 8/1971 | Kasselmann | 303/21 F |
| 3,667,816 | 6/1972 | Harned | 303/21 F |

Primary Examiner—M. Henson Wood, Jr.
Assistant Examiner—Michael Y. Mar
Attorney—Harold F. McNenny et al.

[57] ABSTRACT

An anti-skid device for mechanically sensing a skid condition of a wheeled vehicle and for automatically regulating braking force to optimize braking effect. The device comprises an enclosed housing in which is mounted linear and rotational inertia bodies arranged to produce balanced forces in a normal braking situation and unbalanced forces in a skid condition. During a skid, a vacuum control circuit having a control port in the housing is operated by the unbalanced force to relieve braking pressure at the controlled wheels to prevent wheel lock-up and consequent loss of braking efficiency. Illustrated modifications include slip clutch means to protect the sensing apparatus from excessive forces under extreme wheel acceleration or deceleration and means to maintain a brake pressure retarding signal beyond a point at which wheel deceleration is returned to proportionality with linear deceleration to allow the controlled wheels to reach synchronous speed to maximize braking effect.

6 Claims, 5 Drawing Figures 3,782,785

BRAKE ANTI-SKID SYSTEM

BACKGROUND OF THE INVENTION

The invention relates to improvements in anti-skid devices for wheeled vehicles such as automobiles and, in particular, the invention relates to a device to automatically adjust braking effort at a wheel approaching or in a skidding condition for maximum braking effect.

In a panic stop or on a low friction road surface, a typical vehicle braking system is capable of retarding rotation of its wheels with sufficient force to cause them to lock-up or stop rotating before the vehicle can be brought to a stop. Relative sliding contact between the wheels and roadway during such a process greatly reduces the friction coefficient between the wheels and road which, at least, requires a longer stopping distance to bring the vehicle to a full stop and, worse, may result in a loss of directional control of the vehicle.

In recognition of these problems, various devices and approaches have been proposed to prevent manual over application of a vehicle's brakes. Certain types of devices including that of the present invention take advantage of the principle that in a non-skid braking situation angular deceleration of a wheel is proportional to linear deceleration of the vehicle while in a skid condition the angular deceleration of a wheel generally will be proportionately different than the linear deceleration. Accordingly such devices are adapted to compare angular wheel deceleration with linear vehicle deceleration and to automatically decrease an applied braking force when angular wheel deceleration is proportionately greater than linear deceleration.

SUMMARY OF THE INVENTION

The invention provides a mechanical accelerometer device having a displaceable control member movable in response to disproportionate rates of linear and angular wheel deceleration. Means are provided to convert movement of the control member to a vacuum signal which, in turn, causes reduction of an applied braking force to selected wheels to automatically equalize angular and linear deceleration rates to maintain or return to a non-skid condition.

In the illustrated embodiments, there is mounted in an enclosed housing a pendulum forming a control member on which is rotatably supported an inertia body of flywheel. The flywheel is driven by a gear rotating about the pivot axis of the pendulum at a speed directly proportional to the rotational wheel speed. The pendulum and flywheel are arranged to swing in a plane parallel to a direction of a vehicle travel. Linear deceleration of the vehicle produces a corresponding first force on the pendulum while angular wheel deceleration results in a corresponding second force on the pendulum opposite to the first force. The geometry and mass of the pendulum and flywheel are such that in normal non-skid braking situations these forces balance one another.

When a manually controlled braking force is excessive and angular wheel deceleration thereby becomes proportionately greater than linear deceleration, the associated second force on the pendulum exceeds the first pendulum force and the pendulum is caused to move relative to a vacuum valve port in the housing. A resulting vacuum signal is utilized in a vacuum operated apparatus to automatically reduce the effective braking force on the controlled wheels to minimize slip between the wheels and pavement.

According to one modification of the invention there is provided means for safeguarding the accelerometer device from destructive forces which may otherwise be developed in cases of extreme acceleration and deceleration of the wheels. As illustrated, the safeguarding means comprises a friction slip clutch interposed in a drive system between a rotary input member of the device and the inertia flywheel.

In another disclosed modification, there is included means for momentarily extending the time period of controlled reduced braking effort to enhance performance of the device. As detailed hereinafter, such signal prolonging means is embodied as an energy storing spring member adapted to maintain the control pendulum in operative position for a short delay after an equalization of deceleration rates to permit the wheels to accelerate to synchronous or near synchronous speed for maximum overall braking efficiency.

A still further modification includes means for automatically reducing applied braking force during the initial period of excessive wheel deceleration, as above described, and during a subsequent period in which the wheels are allowed to quickly accelerate towards synchronization and thereby optimize brake performance. Such means includes a modified bidirectional pendulum control member and vacuum valve port in which valve actuation is caused by either excessive angular wheel deceleration or by angular wheel acceleration. While functioning differently, the present modification achieves a similar result of optimum braking performance as the spring delay means of the last mentioned modification.

DESCRIPTION OF THE PREFERRED EMBODIMENT

Figure 1:
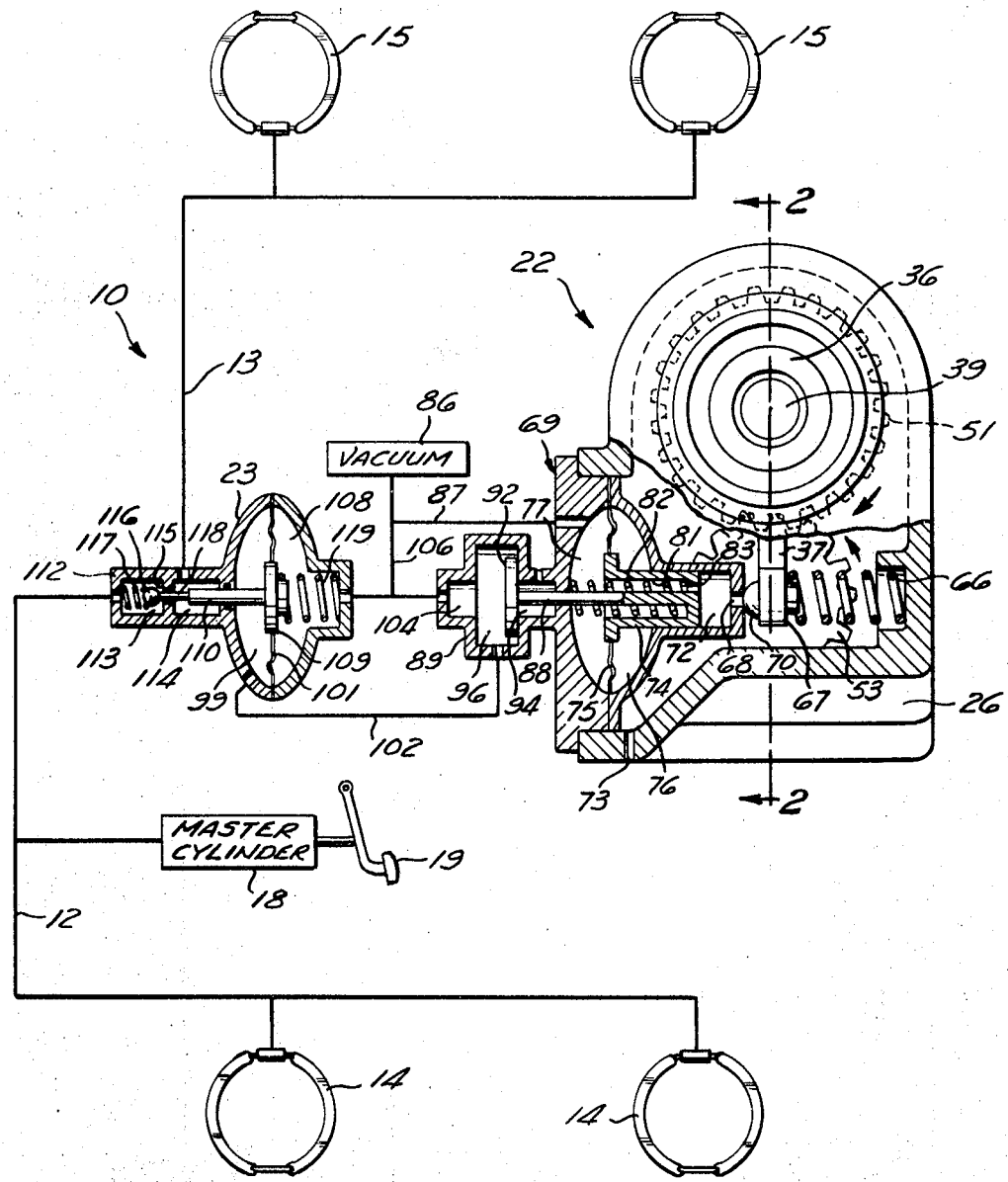
FIG. 1 is a somewhat schematic view of an anti-skid device in a vehicle braking system embodying the invention with various portions thereof in section.

Referring now to FIG. 1, there is schematically shown a brake control system 10 which in the illustrated embodiment includes a hydraulic circuit having branches 12 and 13 leading to front wheel brakes 14 and rear wheel brakes 15 respectively. Connected to these circuit branches 12 and 13 is a conventional master cylinder 18 which may be power assisted and which is manually operated by depressing a foot pedal 19. When thus operated, the master cylinder 18 normally pressurizes hydraulic fluid in the circuits 12 and 13 to cause the brakes 14 and 15 to exert rotation retarding or braking forces on their respective wheels.

As will be explained below, an anti-skid device 22 is provided to automatically regulate fluid pressure in the circuit or control line 13 associated with the rear wheels. While the device 22 is illustrated as controlling only pressure to the rear wheel brakes 15 it will be understood that the device may, if desired, be used to control the front wheel brakes 14 alone or with the rear wheel brakes as desired. When the anti-skid device 22 senses a skid condition, evidenced by a disproportionate relationship between vehicle deceleration and angular deceleration of the rear wheels, an associated actuator 23 is operated to interrupt communication between the master cylinder 18 and the rear circuit 13 to thereby decrease hydraulic pressure in the circuit. Linear wheel deceleration may be considered the same as linear vehicle deceleration.

Figure 2:
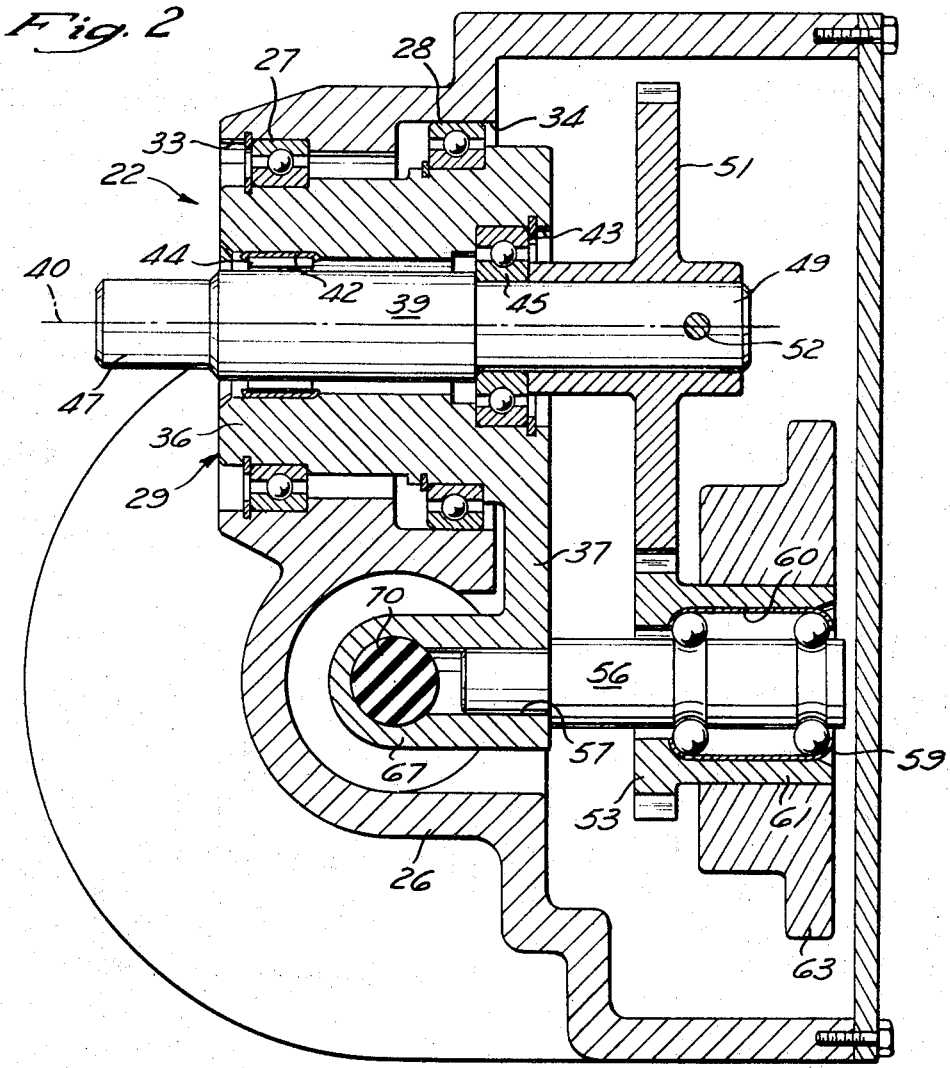
FIG. 2 is an elevational cross-sectional view on a somewhat enlarged scale of a portion of the anti-skid device taken along the line 2—2 indicated at FIG. 1.

In detail, the anti-skid device 22 includes a substantially enclosed accelerometer housing 26 as shown in FIGS. 1 and 2. Pivotally mounted by means of anti-friction bearings 27 and 28 is a pendulum or control member 29 in the housing 26. The bearings 27 and 28 are pressed into respective cylindrical bores 33 and 34 formed in the interior of the housing 26. The pendulum 29 has a crank configuration and includes a generally cylindrical portion 36 and an integral depending leg portion 37. At its outer surfaces, the cylindrical portion 36 of the pendulum 29 is supported in the inner races of the anti-friction bearings 27 and 28.

At its center, the cylindrical portion 36 is bored throughout its length for receiving therein an input shaft 39. The central bore of the cylindrical pendulum portion 36 is defined by a plurality of cylindrical bores each concentric with a pivot axis 40 of the pendulum 29. These central bores include a pair of axially spaced bearing receiving bores 42 and 43 in which associated bearings 44 and 45 support the input shaft 39 for rotation about the pendulum pivot axis 40.

As viewed in FIG. 2, the input shaft 39 includes at its outer or leftward end a reduced diameter portion 47 adapted to be positively connected with a member rotating at a speed proportional to the rotational speed of the rear wheels such as a component in a drive system or transmission driving the controlled rear wheels.

On an inner or rightward end 49 of the input shaft 39 there is mounted a spur gear 51 fixed thereon by a pin 52. This gear 51 drivingly engages a pinion gear 53. The pinion gear 53 is journaled on a stub shaft 56 pressed into a hole 57 provided in a lower end of the pendulum leg portion 37 such that the pinion 53 rotates about an axis parallel to the pivot axis 40 of the pendulum 29. An axial bore 60 in an axial hub 61 of the pinion 53 provides an interference fit with a bearing assembly 59 which rotatably supports and axially locates the pinion on the shaft. Permanently fixed on the pinion hub 61, such as by a heavy press fit, is a circular inertia body or flywheel 63.

Integral with the depending pendulum leg 37 is a finger or projection 67 which is adapted to move relative to a vacuum control valve port 68 within the housing 26. A rubber or elastomeric sealing control member 70 is provided on the pendulum projection 67 to form an efficient seal with the port 68 and to damp motion of the pendulum 29. A compression spring 66 in the housing 26 lightly biases the pendulum projection 67 against the vacuum port 68. The housing 26 is substantially enclosed to protect the various moveable parts and vacuum port 68 therein from contamination and fouling by environmental dirt and fluids. The interior of the housing 26 is maintained at atmospheric pressure by means of a vent or port 73.

The vacuum control port 68 is associated with apparatus indicated generally at 69 through which displacement of the pendulum control member projection 67 is converted to a vacuum signal for operation of the actuator 23 associated with the hydraulic brake circuit 13. The apparatus 69 includes a cylindrical chamber 72 in communication with the vacuum control port 68. Slidably disposed in the cylindrical chamber 72 is a piston 74 extending from the cylindrical chamber 72 leftwardly into a space 76.

The piston 74 is attached by suitable means to a diaphragm 75 separating the space 76 and another internal space 77 of the apparatus 69. The piston 74 is formed with a central bore 81 from its left along substantially its full length in which is received a compression spring 82. The compression spring 82 abuts against an opposed wall associated with the space 77 and is dimensioned to yieldably hold the piston 74 in the position shown in FIG. 1. The space 77 is connected with the piston chamber 72 through the piston bore 81 and a relatively small aperture 83 in the piston 74. The leftward space 77 is also connected to a source of vacuum 86 by line 87. In an automotive vehicle the vacuum source 86 may be provided by an intake manifold of an engine, for example.

As seen in FIG. 1, the piston 74 includes an integral axial stem 88 extending leftwardly into a valve section 89 of the apparatus 69. Secured to an end of the stem 88 is a poppet 92. In the position illustrated in FIG. 1, the poppet 92 prevents fluid communication between a central space 94 at atmospheric pressure and a chamber 96 in which the poppet is disposed. The poppet chamber 96 is in communication through a line 102 with a space 99 in the actuator 23 formed in part by a diaphragm 101. Thus, the pressure in the chamber 99 will be the same as that prevailing the the poppet chamber 96.

Included in the valve section 89 is an end space 104 normally in direct communication with the poppet chamber 96 and isolated therefrom when the poppet 92 moves axially to the left as explained below. A line 106 connects the vacuum source 86 to the end space 104 so that the poppet chamber 96 is normally at subatmospheric pressure. The line 106 also connects the vacuum source 86 to a space 108 on the right of the diaphragm 101 in the actuator 23. A diaphragm piston 109 is attached to the diaphragm 101 and includes a cylindrical axial projection 110. At the left of the actuator 23 there is provided an extension 112 in which is formed a pair of passages 113 and 114. The passages 113 and 114 normally communicate with each other through a valve seat 115 thereby allowing fluid pressure from the master cylinder 18 to travel to the rear wheel brakes 15 through the line 13.

A ball or poppet 116 is adapted to seal the seat 115 upon rightward movement of the piston 109 as explained below. A light compression spring 117 is proportioned to insure that the ball 116 will seal the seat 115 upon rightward movement of the piston projection 110 and a separate intermediate pin 118. A compression spring 119 biases the diaphragm piston 109 leftwardly to the position illustrated in FIG. 1.

In operation, when the anti-skid device 22 senses a skid condition the control port 68 is opened to atmospheric pressure in the housing 26 which causes the ball 116 to seal through operation of the vacuum circuits to reduce hydraulic pressure in the line 13 to the rear brakes 15.

In greater detail, with reference to FIG. 1 normal forward vehicle motion is assumed to be from right to left. Upon linear or translational deceleration of the vehicle, the combined inertia of the pendulum 29, stub shaft 56, gear 53 and inertia body 63 will tend to force the pendulum control projection 67 leftwardly against the vacuum control port 68.

At the same time, angular deceleration of the rear wheels results in angular deceleration of the input shaft 39 and associated gear 51. Rotational inertia of the inertia body or flywheel 63 and pinion gear 53 in this situation tends to cause the pinion gear to walk counterclockwise around the larger gear 51 and therefore exerts a rightward force on the pendulum control projection 67, that is, opposite in direction to the inertia force on the pendulum developed by linear deceleration. The device 22 thus mechanically compares angular wheel deceleration with linear vehicle deceleration. When the wheels are not skidding relative to the pavement in the direction of travel, the angular deceleration of the wheels is directly proportional to the linear deceleration of the vehicle. The geometry and mass of the pendulum 29 and various members thereon is determined such that the leftward linear deceleration inertia force is substantially balanced by the rightward angular deceleration inertia force in a non-skid situation.

When hydraulic pressure to the rear brakes 15 is excessive the associated wheels will tend to lock-up or stop rotating. In this situation the rightward force of angular deceleration on the pendulum 29 will exceed the leftward force of linear deceleration whereby the forece of the spring 66 is overcome and the pendulum control finger 67 is caused to open the vacuum control port 68. Pressure in the associated chamber 72 rises substantially to atmospheric pressure owing to a relatively small flow rate through the small port 83 in comparison to that through the control port 68. pressurization of the chamber 72 forces the piston 74 to the left causing the poppet 92 to move leftwardly until it seals the end space 104 from the poppet chamber 96.

As previously indicated, atmospheric pressure then exists in the poppet chamber 96 as well as in the space 99 of the actuator 23. This increased pressure in space 99 operates on the diaphragm 101 and associated piston 109 causing these elements to move rightwardly. Corresponding rightward movement of the projection 110 and intermediate pin 118 allows the ball poppet 116 to seal the seat 115 and thereby prevent communication between the master cylinder 18 and rear wheel brakes 15. Further rightward movement of the actuator piston 109 and its extension 110 increases the volume of the passage 114 to reduce hydraulic pressure in the line 13 and in the brakes 15.

Applied braking force is thereby reduced so that the angular deceleration rate of the rear wheels is decreased. This results in a net leftward force on the pendulum control projection 67 causing the control port 68 to again be closed. Operation of the vacuum apparatus 69 and actuator 23 is reversed from that just described so that the various elements return to the positions thereof illustrated in FIG. 1. At this point, the master cylinder is again directly connected with the hydraulic line 13 and the rear brakes 15. During a single manual application of the vehicle brakes 14 and 15, the anti-skid device 22 may complete the cycle of relieving pressure to the rear brakes a number of times.

Figure 3:
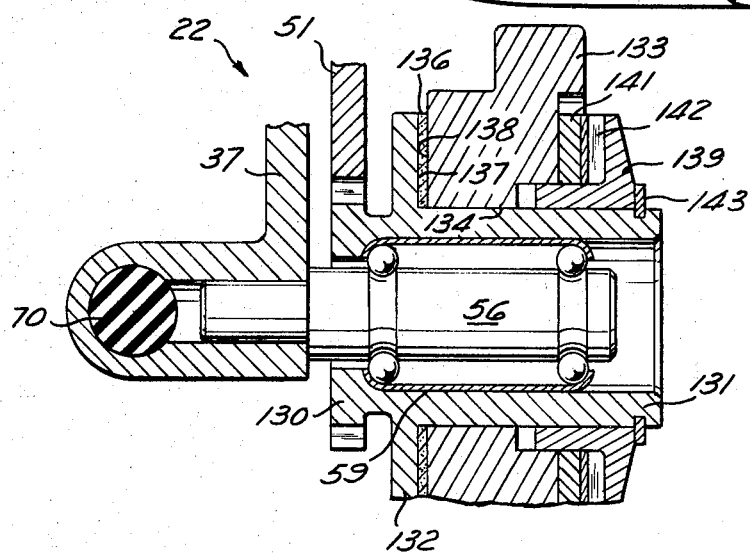
FIG. 3 is a fragmentary view of a first modification of a rotational inertia section of the anti-skid device illustrated in the previous figures.

Referring now to FIG. 3, there is shown a modification of the anti-skid device 22 wherein means are provided to protect the device from excessive forces which may otherwise be developed in situations of extreme angular wheel deceleration or acceleration. Like numerals are used in FIG. 3 to designate parts which are the same as used in FIGS. 1 and 2. As above, the gear 51, driven with the rear wheels of the vehicle, is provided to drive a pinion gear 130 rotatably mounted on the stub shaft 56 by means of the bearing assembly 59. Integral with the pinion gear 130 is an elongated cylindrical hub portion 131 and radially extending flange 132. An inertia body or flywheel 133 includes a central cylindrical bore 134 dimensioned to allow the flywheel to rotate on the pinion hub portion 131. A disk or element of friction material 136 is provided between opposed radial faces 137 and 138 of the flange 132 and flywheel 133 respectively. At an outer end of the pinion hub 131 there is mounted a flange ring 139 on which, in turn, is mounted a washer 141 and wave spring 142. The flange ring 139 is axially retained on the pinion hub 131 by a C washer 143 or the like.

The anti-skid device 22 operates in essentially the same manner as that described above in relation to FIGS. 1 and 2 except that the wave spring 142 and the various other parts mounted on the pinion hub 131 are dimensioned to permit the disk 136 to yield or slip and the flywheel 133 to move angularly relative to the pinion 130 at a predetermined maximum torque. The value of the slipping torque is determined such that it is at least sufficient to overcome any expected force on the pendulum 29 caused by linear braking deceleration of the vehicle but limited to a value which will not harm the associated parts.

Figure 4:
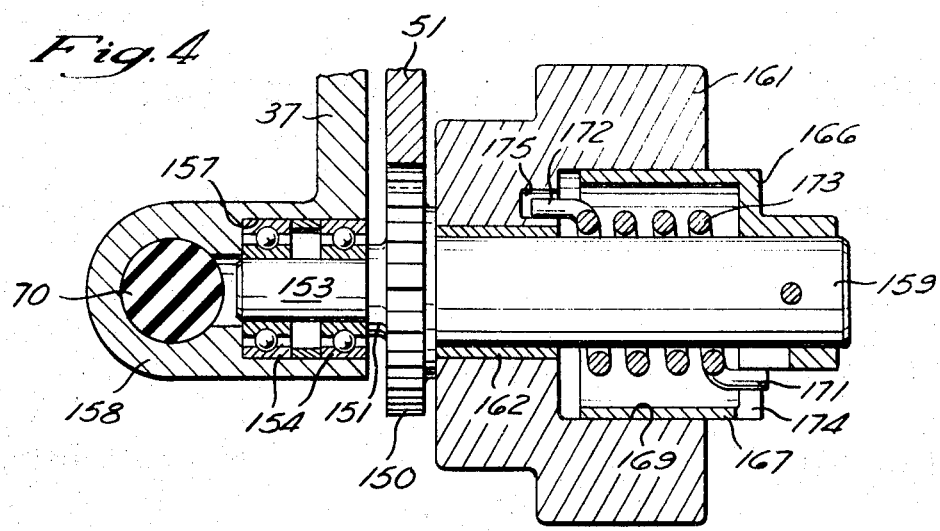
FIG. 4 is a fragmentary view of a second modification of the rotational inertia section of the anti-skid device illustrated in FIGS. 1 and 2.

FIG. 4 illustrates another modification of the anti-skid device illustrated in FIGS. 1 and 2. Again, like numerals designate like parts. The gear 51 driven with the rear vehicle wheels drives a pinion gear 150, which, in the illustrated form, is integral with a rotatable stub shaft 151. The stub shaft 151 includes a reduced diameter portion 153 press fitted into the inner races of a pair of anti-friction bearings 154. These bearings 154 are mounted in a bore 157 formed in a suitably modified lower end projection 158 of the pendulum 29. The stub shaft 151 includes a cylindrical outer end 159 on which an inertia body or flywheel 161 is rotatably mounted by means of a sleeve bearing 162. Pinned or otherwise fixed to the shaft end 159 is a cup shaped sleeve 166. The outer diameter of a section 167 of the sleeve 166 is slightly smaller than a corresponding diameter of an end bore 169 of the flywheel 161 to permit the flywheel 161 to rotate relative to the sleeve 166. Opposite ends 171 and 172 of a helical torsion spring 173 are assembled in axial holes or slots 174 and 175 in the sleeve 166 and flywheel 161 respectively.

With the modification illustrated in FIG. 4, anti-skid device 22 operates in general as that discussed in relation to FIGS. 1 and 2 with the exception that the torsion spring 173 is adapted to prolong a cycle of operation of the device 22 slightly beyond the instant that linear and angular deceleration rates are equal. With braking effort reduced over a slightly longer time beyond the point where the deceleration rates are matches, the wheels are allowed to accelerate to synchronous or ideal speed in relation to the velocity of the vehicle. At this time, maximum braking effect can again be achieved when full hydraulic pressure is permitted by the actuator 23 to be applied to the rear wheel brakes 15.

The torsion spring or element 173 provides this signal delay by storing energy when the rear wheels decelerate and the flywheel 161 runs ahead or rotates relative to the stub shaft 151 in a forward direction and thereby uncoils the spring. Energy stored in elastic distortion or yielding of the spring 173 is then available as additional torque on the shaft 151 to momentarily influence the device 22 by keeping the pendulum 29 away from the vacuum control port 68 after linear and angular deceleration rates are matched.

Another modification of the anti-skid device 22 is somewhat schematically illustrated in FIG. 5 where the vacuum control port 68 of FIG. 1 is modified to achieve certain benefits discussed below. As in the other modifications, the same parts are designated with the same numerals previously used. The pendulum 29 is modified at its lower end to include a spherical projection 180. The spherical projection or end 180 is received in a close fitting cylindrical guideway or socket 181 of a control member 182. The socket 181 permits universal movement of the pendulum end 180 therein so that swinging movement of the pendulum 29 produces horizontal movement of the control member 182.

Figure 5:
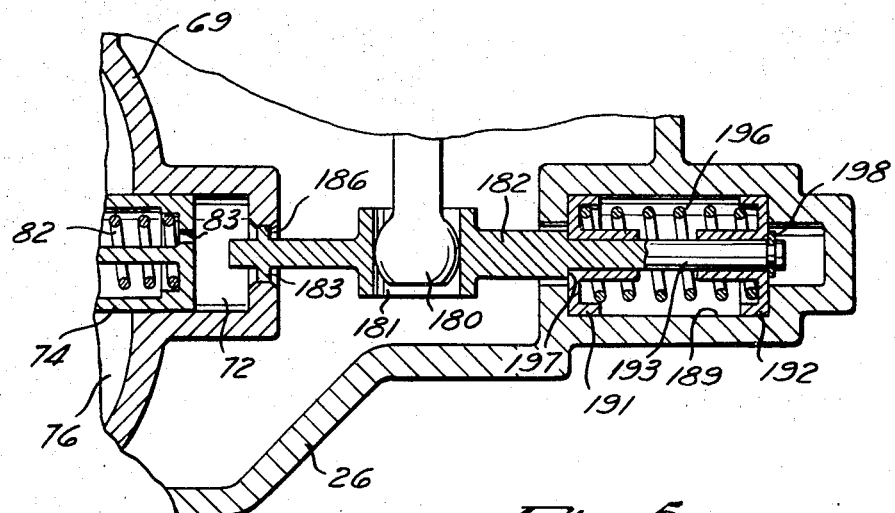
FIG. 5 is a fragmentary view of a modification of a vacuum valve port section of the anti-skid device.

As viewed in FIG. 5 the leftward end of the control member 182 includes a valve spool portion 183 in sealing cooperation with a control port 186 corresponding to the control port 68 of FIG. 1. Rightwardly, the control member 182 extends into a cylindrical spring retaining cavity 189. A pair of oppositely facing bushings 191 and 192 are slidably mounted on a reduced diameter length 193 of the control member 182. A compression spring 196 is retained between the bushings 191 and 192 with a slight amount of pretension. A radial shoulder 197 formed at an inner end of the reduced diameter portion 193 of the control member abuts the associated bushing 191. The bushing 191 compresses the spring 196 when the control member 182 is caused to move rightwardly. Oppositely, a retaining ring or washer 198 moves the associated bushing 192 to compress the spring 196 when the control member 182 moves leftwardly. It follows that the spring 196 resists both leftward and rightward movement of the pendulum end 180 from the position of FIG. 5.

Operation of the modification shown in FIG. 5 is similar to that described in relation to the embodiment of FIGS. 1 and 2. When angular wheel deceleration exceeds the equivalent linear deceleration, the pendulum end 180 is caused to move rightwardly from its position illustrated in FIG. 5. In the same fashion as the spring 66 of FIG. 1, the compression spring 196 resists rightward movement of the control member 182. When the deceleration rates are of sufficiently different magnitudes, a resulting net rightward force on the pendulum 29 moves the control member 182 to compress the spring 196 and move the control spool 183 out of sealing cooperation with the control port 186. A brake pressure reducing signal is produced as explained above in relation to FIGS. 1 and 2 when the chamber 72 becomes pressurized to substantially atmospheric pressure.

Since the anti-skid device 22 operates to correct manually applied hydraulic braking pressure after excessive deceleration of the vehicle wheels is sensed, at the instant the device causes the deceleration rates to equalize the controlled wheels will be rotating a speed somewhat less than synchronous speed. At this point maximum braking effect is not achieved since there is more than an ideal amount of sliding occurring between the pavement and wheels. To achieve maximum braking effect, then, it is desirable to allow the wheels to accelerate towards synchronous speed.

By prolonging the period of reduced hydraulic pressure to the rear brakes throughout the actuator 23, the controlled wheels will be allowed to accelerate up to synchronous speed. During this time the vehicle will be caused to further decelerate through conversion of its kinetic energy into rotational kinetic energy of its wheels as they are sped up by contact with the pavement. The modification illustrated in FIG. 5 performs this signal prolonging or delaying function by sensing wheel acceleration and maintaining the control port 186 open or in communication with the interior of the housing 26.

Wheel acceleration, as may be visualized by reference to FIG. 1, will cause a leftward force on the pendulum 29 as the flywheel 63 is accelerated by the pinion gear 53. With the vehicle decelerating the linear deceleration force on the pendulum 29, as explained above, is also to the left so that the pendulum end 180 will move to the left when the combined linear deceleration force and angular acceleration force is sufficient to overcome the resistance of the compression spring 196. Corresponding leftward movement of the spool 183 relative to the port 186 will open the port and allow the chamber 72 to be pressurized to reduce the hydraulic braking pressure.

When synchronous speed is reached wheel acceleration goes to zero as does linear vehicle deceleration. The pendulum end 182 swings to its centered position of FIG. 5 thereby permitting full hydraulic braking force to be applied to the control wheels and, if necessary, a repetition of the automatic cycle of the anti-skid device 22. Relief of brake pressure during wheel acceleration is especially desirable under conditions of low tire adhesion such as on icy pavement where there is a relatively low friction force available to bring the wheels back up to synchronous speed.

Although a preferred embodiment and specific modifications of this invention are illustrated, it is to be understood that various other modifications and rearrangements of parts may be resorted to without departing from the scope of the invention as disclosed. For instance, it is apparent that the modification illustrated in FIG. 3 may be combined with the modification illustrated in FIG. 5 to achieve the benefits of both modifications in a single device.

What is claimed is:

1. In an acceleration comparing apparatus for an anti-skid device of a wheeled vehicle, the combination comprising means to sense linear deceleration of the vehicle, means to sense angular deceleration of a vehicle wheel, and means to mechanically compare the linear deceleration of the vehicle sensed by said linear sensing means with the angular deceleration sensed by said angular sensing means, said angular decleration sensing means including a rotary input shaft, drive train means including a first gear driven by said rotary input shaft, and a second gear driven by said first gear, a rotational inertia body driven with said second gear, said drive train means including torque limiting means adapted to limit torque transmitted between said input shaft and said inertia body whereby said apparatus is protected from excessive forces otherwise developed through rapid changes of speed of said rotational inertia body.

2. In an acceleration comparing apparatus for an anti-skid device of a wheeled vehicle, the combination comprising means to sense linear deceleration of the vehicle, means to sense angular deceleration of a vehicle wheel, and means to mechanically compare the linear deceleration of the vehicle sensed by said linear sensing means with the angular deceleration sensed by said angular sensing means, said angular deceleration sensing means including a rotary input shaft, drive train means including a dirst gear driven by said rotary input shaft, and a second gear driven by said first gear, a rotational inertia body driven by said second gear, said drive train means including spring means operably connected between said input shaft and said inertia body for storing energy for use in extending a period in which said angular deceleration sensing means influences said comparing means beyond the time actual angular deceleration becomes proportionately equal to linear deceleration.

3. An anti-skid device for a wheeled vehicle comprising a substantially enclosed housing, means to maintain said enclosed housing at substantially atmospheric pressure, mechanical inertia means to sense a non-proportional change in linear and angular deceleration of a vehicle wheel defining a skid condition, means for mounting the mechanical inertia means in the housing, the inertia means including a control member displaceable from a normal position in the housing to a second position in response to a skid condition evidenced by excessive angular deceleration of a wheel in relation to linear vehicle deceleration, vacuum control means including means to regulate hydraulic pressure in a brake control line of the vehicle to reduce wheel braking force when said control member is in said second position, said vacuum control means including port means in the housing, said displaceable control member having port sealing surface means movable into and out of sealing cooperation with said vacuum port means as it is displaced between said normal position and said skid position, and a control chamber associated with said port means maintained at subatmospheric pressure when said control member is in said normal position and substantially at atmospheric pressure when said control member is in said second position.

4. An anti-skid device for a wheeled vehicle comprising a substantially enclosed housing, mechanical inertia means to sense a non-proportional change in linear and angular deceleration of a vehicle wheel defining a skid condition, means for mounting the mechanical inertia means in the housing, the inertia means including a control member displaceable from a normal position in the housing to a second position in response to a skid condition evidenced by excessive angular deceleration of a wheel in relation to linear vehicle deceleration, vacuum control means including port means in the housing, said displaceable control member having port sealing surface means movable into and out of sealing cooperation with said vacuum port as it is displaced between said normal position and said skid position, said vacuum control means including means to regulate hydraulic pressure in a brake control line of the vehicle to reduce wheel braking force when said control member is in said second position, said mechanical inertia means including an inertia flywheel, mechanical drive means including a rotary input member, said rotary input member operably connected to drive the flywheel at a rotational speed proportional to the rotational speed of a wheel, and yieldable element means including a friction slip clutch operably connected between said flywheel and said rotary input member and limiting maximum torque transmitted therebetween.

5. An anti-skid device for a wheeled vehicle comprising a substantially enclosed housing, mechanical inertia means to sense a non-proportional change in linear and angular deceleration of a vehicle wheel defining a skid condition, means for mounting the mechanical inertia means in the housing, the inertia means including a control member displaceable from a normal position in the housing to a second position in response to a skid condition evidenced by excessive angular deceleration of a wheel in relation to linear vehicle deceleration, vacuum control means including port means in the housing, said displaceable control member having port sealing surface means movable into and out of sealing cooperation with said vacuum port as it is displaced between said normal position and said skid position, said vacuum control means including means to regulate hydraulic pressure in a brake control line of the vehicle to reduce wheel braking force when said control member is in said second position, said mechanical inertia means including an inertia flywheel, mechanical drive means including a rotary input member, said rotary input member operably connected to drive the flywheel at a rotational speed proportional to the rotational speed of a wheel, and a spring member adapted to transmit torque between said input member and said flywheel and store energy for extending the period said control member is in said second position beyond a time when angular wheel deceleration and linear vehicle deceleration rates return to non-skid proportionality.

6. An anti-skid device for a wheeled vehicle comprising a substantially enclosed housing, mechanical inertia means to sense a non-proportional change in linear and angular deceleration of a vehicle wheel defining a skid condition, means for mounting the mechanical inertia means in the housing, the inertia means including a control member displaceable from a normal position in the housing to a second position in response to a skid condition evidenced by excessive angular deceleration of a wheel in relation to linear vehicle deceleration, vacuum control means including port means in the housing, said displaceable control member having port sealing surface means movable into and out of sealing cooperation with said vacuum port as it is displaced between said normal position and said skid position, said vacuum control means including means to regulate hydraulic pressure in a brake control line of the vehicle to reduce wheel braking force when said control member is in said second position, said control member being displaceable to a third position from said normal position and opposite from said second position in response to angular wheel acceleration, said port sealing surface means being movable in and out of sealing cooperation with said vacuum port means as it is displaced between said normal position and said third position, said pressure regulating means reducing wheel braking force when said control member is in said third position whereby spin-up response of the wheel to synchronous speed is improved.

* * * * *